United States Patent [19]

Gerhart

[11] Patent Number: 4,959,768

[45] Date of Patent: Sep. 25, 1990

[54] APPARATUS FOR TRACKING PREDETERMINED DATA FOR UPDATING A SECONDARY DATA BASE

[75] Inventor: Paul B. Gerhart, Horsham, Pa.

[73] Assignee: Honeywell Inc., Minneapolis, Minn.

[21] Appl. No.: 299,857

[22] Filed: Jan. 23, 1989

[51] Int. Cl.⁵ .............................................. G06F 11/20
[52] U.S. Cl. ...................................... 364/187; 371/9.1
[58] Field of Search ........................... 364/187; 371/9.1

[56]  References Cited

U.S. PATENT DOCUMENTS

| 4,031,372 | 6/1977 | Davis | 371/9.1 |
| 4,351,023 | 9/1982 | Richer | 371/9.1 |
| 4,581,701 | 4/1986 | Hess et al. | 371/9.1 |
| 4,751,702 | 6/1988 | Beier et al. | 371/9.1 |

FOREIGN PATENT DOCUMENTS 2032149  4/1980  United Kingdom ................. 371/9.1

Primary Examiner—Allen MacDonald
Attorney, Agent, or Firm—Arthur A. Sapelli; D. J. Lenkszus; A. Medved

[57]  ABSTRACT

A process control system includes a primary processor connected to a primary memory via a bus. The primary processor transfers data to be stored to said primary memory. An apparatus of the present invention connected to the bus, collects predetermined data of the data being transferred simultaneously with the transfer of the data to the primary memory. The predetermined data collected by the apparatus is subsequently transferred to a backup processor controller to update the data base of the backup process controller. The apparatus comprises a storage element which stores the data collected. A logic unit controls the operation of the apparatus including the collection of the predetermined data. A control unit of the apparatus transfers the predetermined data stored in the storage element to the backup process controller.

2 Claims, 4 Drawing Sheets

APPARATUS FOR TRACKING PREDETERMINED DATA FOR UPDATING A SECONDARY DATA BASE

RELATED PATENT APPLICATIONS

The present patent application is related to U.S. patent application Ser. No. 07/299,859, entitled "METHOD FOR CONTROL DATA BASE UPDATING OF A REDUNDANT PROCESSOR IN A PROCESS CONTROL SYSTEM" by P. McLaughlin et al, filed on even date herewith, and assigned to Honeywell Inc., the assignee of the present application.

BACKGROUND OF THE INVENTION

This invention relates to an apparatus for updating a secondary data base of a redundant processor in a process control system, and more particularly, to an apparatus for tracking changes of predetermined data of a primary data base for subsequent updating of a secondary data base.

Process Control Systems with backup process controllers such as described and claimed in U.S. Pat. No. 4,133,027, issued to J. A. Hogan on Jan. 2, 1979, and U.S. Pat. No. 4,141,066, issued to Y. Keiles on Feb. 20, 1979, include a backup controller having a dedicated Random Access Memory (RAM) and a dedicated Read-Only Memory (ROM). The backup controller is essentially idle or can be doing some background tasks, but generally not tasks relating directly to the process control function. Upon detection of a failure of one of the primary process controllers, the data stored in the RAM of the failed controller must be transferred to the RAM of the backup controller to perform the operations of the primary controller. These systems describe a 1:N redundancy system.

In the present invention, there is provided in a 1:1 redundancy system, an apparatus which captures and stores predetermined information as the information is being stored in a primary memory of a primary controller. The secondary data base of a secondary device (i.e., secondary or backup controller) is updated periodically with the information stored in the apparatus of the present invention such that the updating process does not tie-up or penalize CPU or processor performance of the primary controller and utilizes a minimum amount of time. The apparatus of the present invention captures (and subsequently updates) only the information which was changed, resulting in a more efficient use of the primary CPU or microprocessor, and allows the updating process to be performed more frequently, and on a real-time basis. Thus, when a failover condition occurs, the time to get the secondary controller to take over for a failed primary controller is substantially minimized.

SUMMARY OF THE INVENTION

Therefore, there is provided by the present invention, an apparatus for collecting predetermined information being stored in a primary data base for subsequent updating of a secondary data base. A process control system includes a primary processor connected to a primary memory via a bus. The primary processor transfers data to be stored to said primary memory. An apparatus of the present invention connected to the bus, collects predetermined data of the data being transferred simultaneously with the transfer of the data to the primary memory. The predetermined data collected by the apparatus is subsequently transferred to a backup processor controller to update the data base of the backup process controller. The apparatus comprises a storage element which stores the data collected. A logic unit controls the operation of the apparatus including the collection of the predetermined data. A control unit of the apparatus transfers the predetermined data stored in the storage element to the backup process controller.

Accordingly, it is an object of the present invention to provide an apparatus for collecting predetermined information.

It is another object of the present invention to provide an apparatus for collecting predetermined information being stored in a primary data base.

It is still another object of the present invention to provide an apparatus for collecting predetermined information being stored in a primary data bus for subsequent updating of a secondary data base.

These and other objects of the present invention will become more apparent when taken in conjunction with the following description and attached drawings, wherein like characters indicate like parts, and which drawings form a part of the present application.

DETAILED DESCRIPTION

Figure 1:
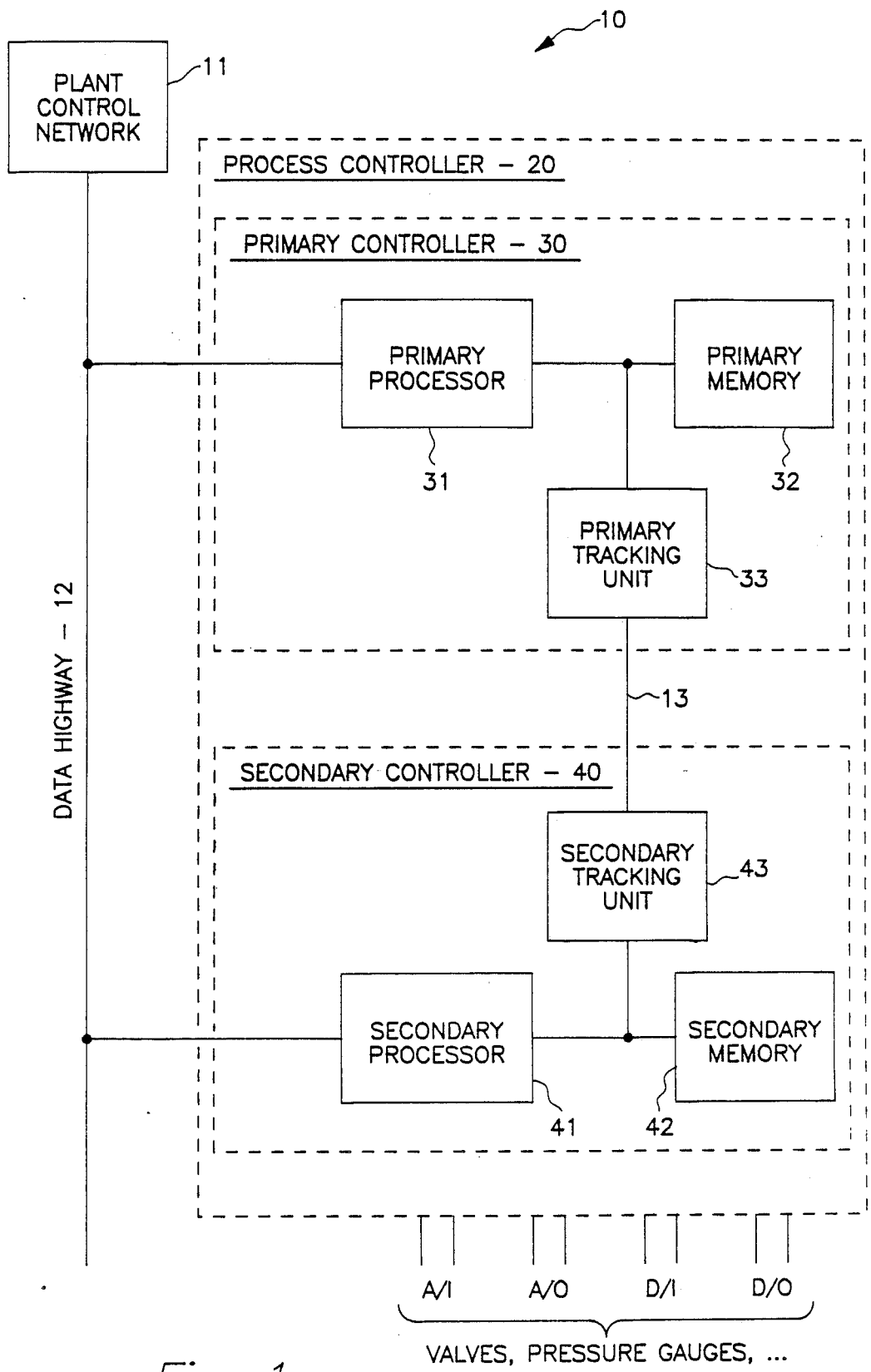
FIG. 1 shows a block diagram of a process control system having a redundant controller.

Referring to FIG. 1, there is shown a block diagram of a process control system 10 having redundant controllers which utilizes the apparatus of the present invention, and more specifically there is shown a functional block diagram of a redundant process controller 20 which includes a primary controller 30 and a secondary controller 40. Although in the description which follows and the identification given to the controllers, the primary controller 30 and the secondary controller 40, the controllers are bidirectional, meaning that either of the redundant (or secondary) controllers can operate fully as a primary or secondary. The labels identified herein as primary and secondary are done strictly for purposes of identification and explanation.

The process control system 10 includes a plant control network 11 and connected thereto is a data highway 12 which permits multiple process controllers to be attached to the data highway 12. The primary controller 30 includes a primary processor 31, a primary memory 32, and a primary tracking unit 33. The secondary controller 40 includes a secondary processor 41, a secondary memory 42, and a secondary tracking unit 43. The primary processor 31 and the secondary processor 41 are each connected to the data highway 12. Primary processor 31 is connected to its primary memory 32 and its primary tracking unit 33. The secondary processor 41 is connected to its secondary memory 42 and its secondary tracking unit 43. Coupled to the process controller 20 are various inputs and outputs including analog inputs (A/I), analog outputs (A/O), digital inputs (D/I), and digital outputs (D/O), these inputs and outputs being connected to various valves, pressure switches, pressure gauges, thermocouples, ... which are used to indicate the current information or status and to control the process of the process control system. The plant control network 11 can be of the type described in U.S. Pat. No. 4,607,256 issued to R. A. Henzel on Aug. 19, 1986, and assigned to the same assignee as the present application. Although not shown, it is understood that the various analog and digital inputs and outputs are connected via appropriate interface apparatus to the primary processor 31 and the secondary processor 41. The tracking unit 33, 43, the apparatus of the present invention of the present application, will be described in further detail hereinunder. Before describing the tracking unit 33, 43, the system which utilizes the apparatus of the present invention will be described in order to more readily understand the function and operation of the tracking unit.

Within the process controller 20, the determination of which controller 30, 40 is to be the primary or secondary, is determined by a download control personality (i.e., command information) from the plant control network 11. At that time one of the controllers 30, 40 will be the primary controller and the other will take the role of the secondary controller 40, the controllers 30, 40 of the process controller 20 having already being identified as the primary controller 30 and the secondary controller 40 in FIG. 1, for purposes of description and example; however, it will be understood that the primary controller could have been the controller 40 and the secondary controller could just as well have been the controller 30. Having thus established the primary/secondary roles of the controllers 30, 40, the primary controller 30 performs the control processing algorithms, which include reading the input data from the valves, pressure gauges, ..., performing predetermined calculations and outputting the results. The data is also stored in the primary memory 32. There is an area of the primary memory 32 that is designated as tracked memory (or tracked RAM). A write to this area, i.e. the tracked RAM will be shadowed by the primary tracking unit 33. The primary tracking unit 33 stores predetermined data simultaneously with the writing of tracked RAM into its own internal storage unit (not shown) in a predetermined format, denoted herein as packets. Upon completion of its processing function for a given time interval, the primary processor 31 transmits control signals to the primary tracking unit 33 thereby initiating transfer of the data stored within the primary tracking unit 33 to the secondary tracking unit 43. Some control information is also transferred by the primary processor 31, i.e., header information, byte count, data type, .... The secondary processor 41 then takes the data stored in the secondary tracking unit 43 and generates the required information from the information packets stored in the secondary tracking unit 43, and updates the secondary memory 42. The secondary processor 41 accepts these packets, performs integrity tests and communicates the results of these tests back to the primary processor 31, extracts the data value, and calculates the address to store the data value in the address identified within the information packet of the secondary memory 42. By performing the update of the secondary memory in this fashion, there is no performance penalty in the primary CPU (i.e., the CPU (not shown) of the processor 31) in writing the tracked memory thereby effectively increasing the bandwidth of the processor 31. The CPU utilized in processor 31, 41, in the preferred embodiment is of the Motorola 68000 family.

The primary and secondary controllers 30, 40 can communicate to each other via three mediums, the data highway 12, the link 13 between the primary and the secondary tracking units 33, 43, and the I/O link (not shown, this link is the path to which the primary processor 31 and the secondary process 41 are connected in order to interface with the A/I, A/O, D/I, and D/O). Via these communication paths, the primary controller 30 can ensure that the secondary controller 40 is present and operational, and the secondary controller can test that the primary controller is operational in order to determine when it (i.e., the controller designated as the secondary) is to assume the primary status (or mode).

Figure 2:
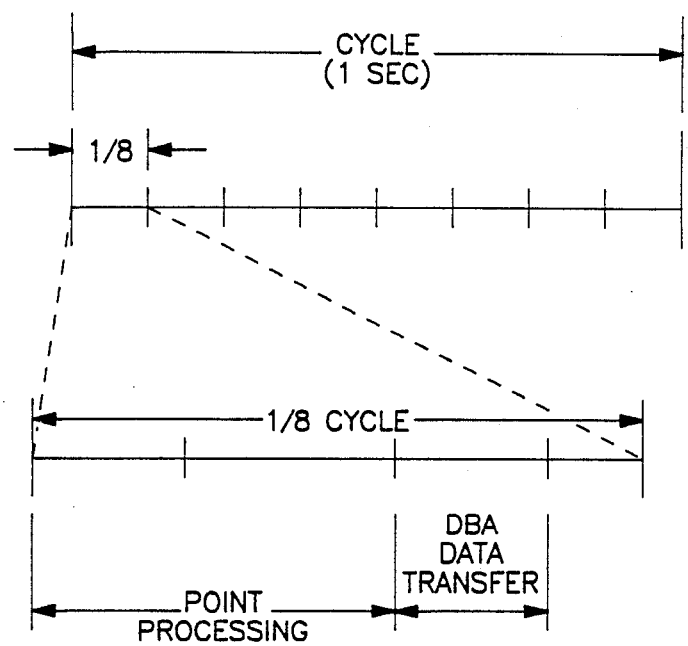
FIG. 2 shows a time allocation which defines a cycle of the controller.

Referring to FIG. 2 there is shown an allocation of time utilized by the primary processor 31. In the system of the preferred embodiment of the present invention, a cycle is defined as a time period of one second and is divided into eight subcycles. Each subcycle, the processor performs the predetermined algorithms as mentioned above (referred to in FIG. 2 as point processing). The time required for the point processing is less than the time of the subcycle. Upon completion of the point processing, the primary processor 31 initiates the transfer of the tracked data to the secondary controller 40 (denoted in the figure as DBA data transfer). From this time frame diagram, it can readily be seen that the data contained in the data base of the secondary controller 40 is one step (i.e., subcycle) behind the data contained in the data base of the primary controller 30. (In systems where every write to the primary memory gets written to the secondary memory, then the primary and secondary will retain the same data base. However, if an error were to occur, i.e., a failure during the transmission of all of the bytes, then the secondary would have a partial set of the bytes, i.e., inconsistent data.) In the system of the present invention, as has been mentioned before, the secondary data base will have complete data but is one step behind that of the primary.

Figure 3:
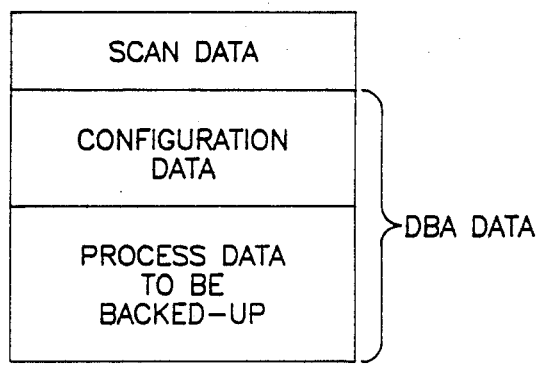
FIG. 3 shows a partial memory map of the primary memory of the controller of the preferred embodiment of the present invention.

Referring to FIG. 3 there is shown a partial memory map of the primary memory 32. Included is the scan data which contains the actual value of the I/O as read from the valves, pressure gauges, .... The section marked configuration data includes information indicating the options which were selected, how points are configured, what algorithms are running, and the like. The section indicating process data to be backed up includes the results of the algorithms. Also included is information to indicate various functions going on such as various timers which are set, various alarms which are set, .... The area of memory mark DBA Data is the area of primary memory 32 (i.e., RAM) that is designated "tracked memory." A write to this area of primary memory 32 will be collected (or also referred to herein as tracked, shadowed, or captured) by the primary tracking unit 33. The data collected by the primary tracking unit 33 is format in a predefined packet, and will be described further hereinunder.

Figure 4:
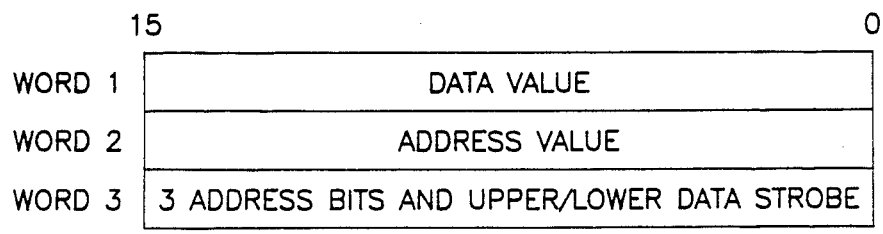
FIG. 4 shows the packet format of the captured data in the preferred embodiment of the present invention.

Referring to FIG. 4, there is shown the format of the packet generated by the primary tracking unit 3 in the preferred embodiment of the present invention. The upper and lower data strobe values indicate the value of the least significant address bit, and the most significant four address bits can be assured due to the layout of the tracked memory. The tracked memory packet is built for every write (byte or word) to the tracked memory but only while memory tracking is requested. An important feature of the primary tracking unit 33 is that there is no performance penalty in writing to the tracked memory. The method of effecting the transfer of the changes to the primary data base from the primary controller 30 the secondary controller 40, which utilizes the apparatus of the present invention, is more fully described in the aforementioned related application.

Figure 5:
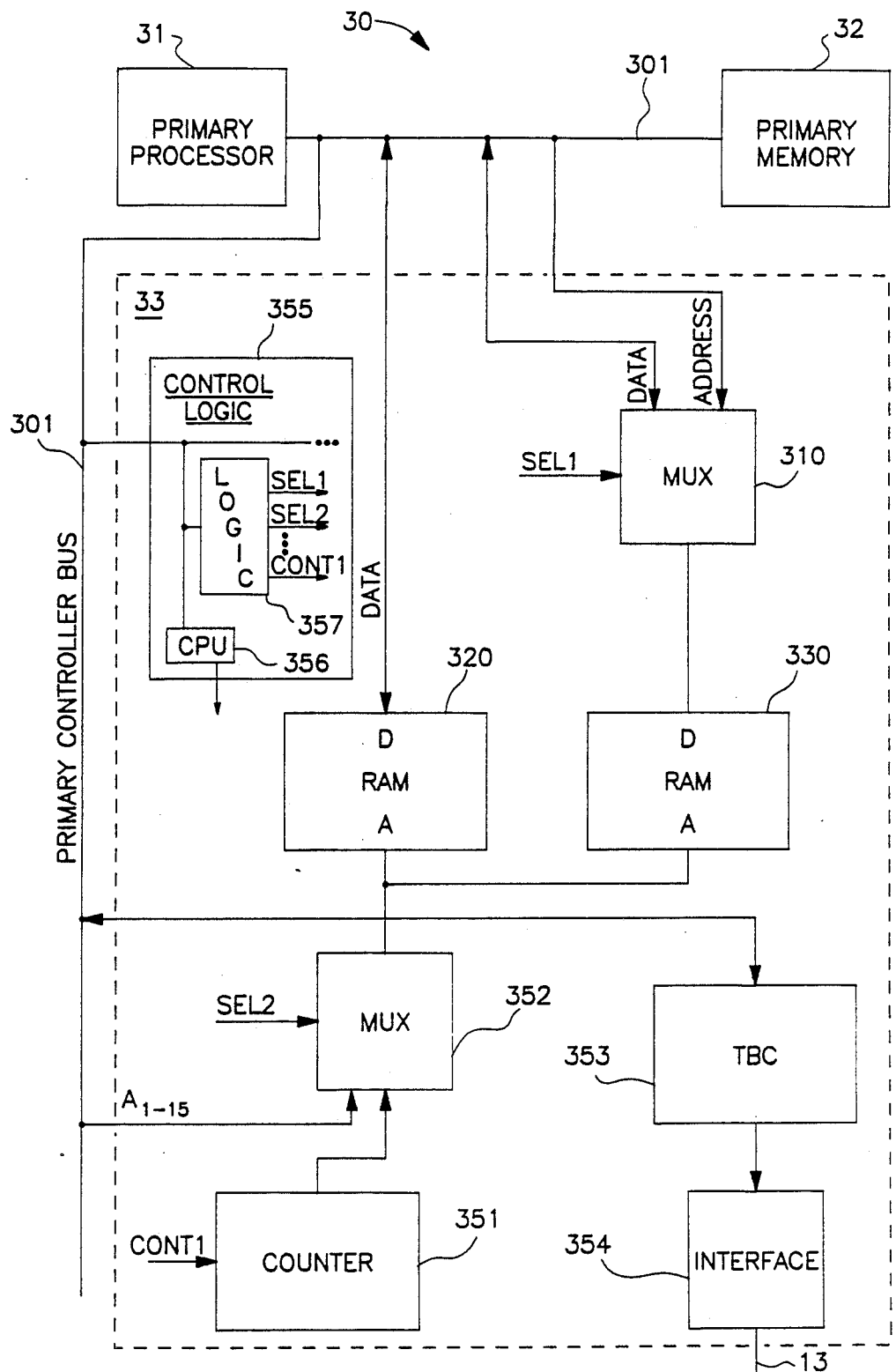
FIG. 5 shows a block diagram of the primary controller, with particular emphasis on the preferred embodiment of the primary tracking unit.

Referring to FIG. 5, there is a block diagram of the primary controller 30, and further showing a block diagram of the preferred embodiment of the primary tracking unit 33. The primary processor 31 is connected to the primary memory 33, via a primary controller bus 301, also referred to herein as a local bus 301. The primary tracking unit 33 is also connected to the local bus 301. A first RAM 320 has its data terminal, D, connected to the data lines of local bus 301. A second RAM 330 has its data terminal, D, connected to an output of a multiplexer (MUX), 310, a first input of the MUX 310 being connected to the data lines of the local bus 301, and a second input of the MUX 310 being connected to the address lines of the local bus 301. A counter 351, which counts the sequential addresses of the first and second RAM 320, 330, is connected to the first input of MUX 352, and the second input of MUX 352 is connected to the address lines of local bus 301. A token bus controller (TBC) 353, which provides the communication control of the primary tracking unit 33 with the secondary tracking unit 43, is connected to the local bus 301. An interface unit 354, connected to TBC 353, is also connected to link 13, and provides the TBC-to-TBC interface. The TBC 353 of the preferred embodiment of the preset invention is a Motorola MC68824 Token-Passing Bus Controller.

Tracked data packets are stored in the RAM 320, 330 of the primary tracking unit 33. The three word packets are not stored sequentially, but in column format. The primary tracking unit stores the packets based on the counter 351 of the primary tracking unit 33, which is incremented by one whenever a packet is stored. This counter 351 is readable by the primary processor 31 in order to ascertain the quantity of data to be transferred. In the transfer of data stored in RAMs 320, 330, the TBCs 353, (i.e., of the primary and secondary tracking unit), pass data such that the data is stored in the RAMs of the secondary tracking unit (not shown). As mentioned above, the structure of the secondary tracking unit 43 is the same as that of the primary tracking unit. The control logic 355 is connected to the local bus 301 and contains logic 357 which generates the control signals SEL1, SEL2, CONT1, . . . . These signals select the first or second input terminals depending on the function being performed, i.e., tracking (collecting or capturing) data being written into the primary memory 32 by the primary processor, or storing data from the RAMs 320, 330 to the primary memory 32. A CPU 356, connected to local bus 301, is also included in the control logic 355 to coordinate control of the tracking unit with the primary processor 31.

Figure 6:
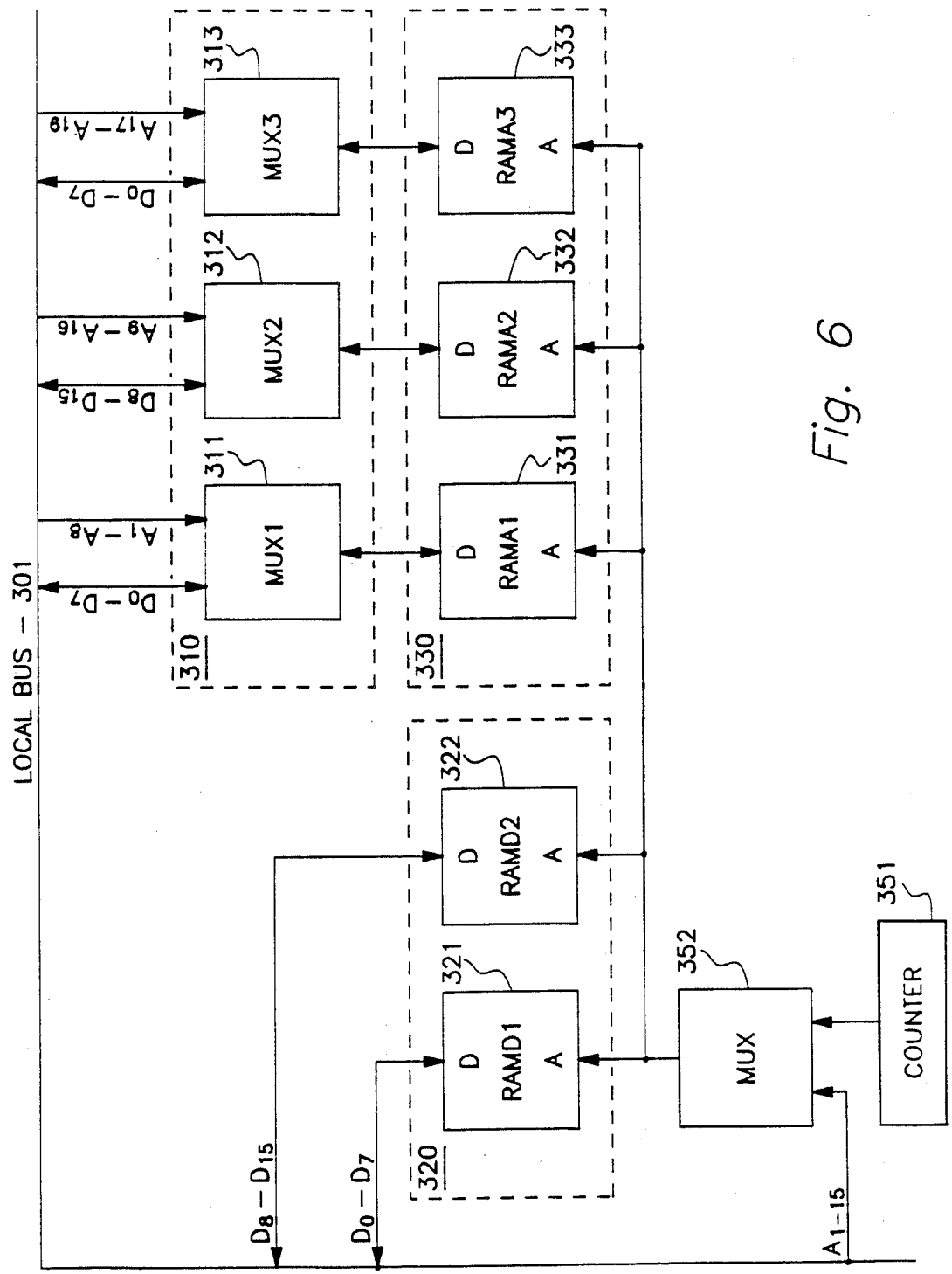
FIG. 6 shows a block diagram of the storage elements of the preferred embodiment of the present invention.

Referring to FIG. 6, there is shown a detailed block diagram of the structure of the storage elements, the RAMs 320, 330, of the preferred embodiment of the present invention. MUX 310 is comprised of MUX 1 311, MUX 2 312, and MUX 3 313. First RAM 320 is comprised of RAMD1 321, and RAMD2 322. Second RAM 330 is comprised of RAMA1 331, RAMA2 332, and RAMA3 333. Each RAM 321, 322, 331, 332, 333 of the preferred embodiment is a 32K × 8 bit RAM. Thus RAMD1 321 and RAMD2 322 store the 16-bit data value (shown in FIG. 4). RAMA1 331, and RAMA2 332 store the 16-bit address value, and RAMA3 333 stores word 3 of the packet, i.e., three address bits and the upper/lower strobe bits. A predefined area of the primary memory 32 (in the preferred embodiment locations 170000 through 19FFFF, Hex) contain the data to be captured. When this area of memory is being written into by the primary processor 31, the primary tracking unit 33 also captures the data and address and stores it in a 40-bit wide memory, i.e., word 1 of RAMD1, RAMD2, RAMA1, RAMA2, and RAMA3, 321, 322, 331, 332, 333, respectively, referred to as "wide memory." Only 37 bits are used—16 data, 19 address and two control strobes (the strobes, UDS and LDS, are necessary to indicate whether a word or byte is being altered in the primary memory). The wide memory is addressed during this time by the 15 bit address counter 351. The value of the counter 351 is incremented by one for each wide write. Thus wide writes are made sequentially into the wide memory 37 bits at a time. The counter is initialized to zero by the CPU 356 which forms part of the control logic 355. The CPU 356 can also read the value of the counter 351. At the completion of data collection (i.e., the point processing time slot), the primary processor 31 signals the primary tracking unit 33 to start the transfer to the secondary controller 40, i.e., the secondary tracking unit 43. The transfer is effected by the TBC 353. The TBC empties the RAMs in 16 bit wide words ("narrow reads"). When addressing the RAMs in narrow style, address space 1C0000 through 1EFFFF) is used. Because the space is an odd number of RAMs wide, three banks of 16-bit wide address space is required although one of them (1E0000 through 1EFFFF) has meaningful data on only its lower byte. The TBC of the secondary tracking unit receives the data and performs "narrow writes" into its RAMs. When all the data has been transferred, the counter 351 is reset, and the next subcycle begins. During the next subcycle, the secondary tracking unit control logic begins emptying the contents of its RAMs and stores the data in the secondary memory 42, thereby duplicating the contents of the data stored in the primary memory 32.

The preferred embodiment of the present invention utilizes parity checking as an approach to protecting memory accesses although not shown. It will be understood by those skilled in the art that other forms of memory protection can be utilized without departing from the scope of the present invention, and will not be described further herein.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. In a process control system, having a primary processor connected to a primary memory via a bus, wherein said primary processor transfers data to be stored to said primary memory, an apparatus, connected to said bus, for collecting predetermined data of said transferred data simultaneously with the transfer of said data to said primary memory, said predetermined data collected by said apparatus to subsequently update a data base of a backup process controller, said apparatus comprising:

(a) storage means, for storing the predetermined data collected, said storage means having a data terminal adapted to receive data to be stored in said storage means, and further having an address terminal adapted to receive address information specifying an address location within said storage means in which the received data is to be stored;

(b) control processing unit (CPU) means, operatively connected to said bus, for coordinating the control of said apparatus with the operation of said primary processor;

(c) logic means, operatively connected to said CPU means, for generating predetermined control signals, to control the storage means;

(d) counter means, operatively connected to said CPU means and to said storage means, for generating the address information to indicate a location of the storage means in which the predetermined data being collected is to be stored;

(e) control means, operatively connected to said storage means and to said logic means, for transferring the predetermined data stored in said storage means to the backup process controller;

(f) a first switch means, interposed between said bus and said storage means, wherein the data terminal of said storage means is connected to the output of said first switch means, a first input terminal of said first switch means is connected to data lines of said bus, and a second input terminal of said first switch means is connected to address lines of said bus, for selecting between the first input terminal and the second input terminal of said first switch means in response to a first control signal to obtain data to be stored in said storage means in a predefined format; and (g) second switch means, interposed between said counter means and said storage means, wherein the address terminal of said storage means is connected to the output of said second switch means, a first input terminal of said second switch means is connected to said counter means, and a second input terminal of said second switch means is connected to address lines of said bus, for selecting address information between said counter means and said bus in response to a second control signal to store or retrieve data, respectively, from said storage means.

2. An apparatus for simultaneously collecting predetermined data of data being transferred on a bus to a memory to subsequently update a backup memory, said apparatus comprising:

(a) storage means, for storing the predetermined data, said storage means having a data terminal adapted to receive data to be stored in said storage means, and further having an address terminal adapted to receive address information specifying an address location within said storage means in which the received data is to be stored;

(b) control processing unit (CPU) means, operatively connected to said bus, for coordinating the control of said apparatus with the operation of said primary processor;

(c) logic means, operatively connected to said CPU means, for generating predetermined control signals, to control the storage means;

(d) counter means, operatively connected to said storage means, for generating the address information to indicate a location of the storage means in which the predetermined data being collected is to be stored;

(e) control means, connected to said storage means and to said logic means, for transferring the predetermined data stored in said storage means to the backup memory;

(f) a first switch means, interposed between said bus and said storage means, wherein the data terminal of said storage means is connected to the output of said first switch means, a first input terminal of said first switch means is connected to data lines of said bus, and a second input terminal of said first switch means is connected to address lines of said bus, for selecting between the first input terminal and the second input terminal of said first switch means in response to a first control signal to obtain data to be stored in said storage means in a predetermined format; and (g) second switch means, interposed between said counter means and said storage means, wherein the address terminal of said storage means is connected to the output of said second switch means, a first input terminal of said second switch means is connected to said counter means, and a second input terminal of said second switch means is connected to address lines of said bus, for selecting address information between said counter means and said bus in response to a second control signal to store or retrieve data, respectively, from said storage means.

* * * * *